United States Patent
Giuffre (10) Patent No.: US 6,945,476 B2
(45) Date of Patent: Sep. 20, 2005

(54) SELF-COMPENSATING DRIP IRRIGATION EMITTER

(75) Inventor: Carmelo Giuffre, Capo d'Orlando (IT)

(73) Assignee: Irritec S.r.L., Capo d'Orlando (IT)

(*) Notice: Subject to any disclaimer, the term of this patent is extended or adjusted under 35 U.S.C. 154(b) by 0 days.

(21) Appl. No.: 10/475,350

(22) PCT Filed: Apr. 10, 2002

(86) PCT No.: PCT/EP02/03965

§ 371 (c)(1),
(2), (4) Date: Nov. 24, 2003

(87) PCT Pub. No.: WO02/085101

PCT Pub. Date: Oct. 31, 2002

(65) Prior Publication Data

US 2004/0164185 A1 Aug. 26, 2004

(30) Foreign Application Priority Data

Apr. 20, 2001 (IT) ................................ SV2001A0012

(51) Int. Cl.[7] .............................................. B05B 15/00
(52) U.S. Cl. ...................................... 239/542; 239/600
(58) Field of Search ................................ 239/542, 601

(56) References Cited

U.S. PATENT DOCUMENTS

| 4,209,133 A | | 6/1980 | Mehoudar |
| 4,210,287 A | | 7/1980 | Mehoudar |
| 5,413,282 A | * | 5/1995 | Boswell ...................... 239/542 |
| 5,609,303 A | | 3/1997 | Cohen |
| 5,615,838 A | * | 4/1997 | Eckstein et al. .......... 239/533.1 |
| 5,628,462 A | * | 5/1997 | Miller ......................... 239/542 |
| 6,464,152 B1 | * | 10/2002 | Bolinis et al. .............. 239/542 |

FOREIGN PATENT DOCUMENTS

EP 0758525 2/1997

* cited by examiner

Primary Examiner—David A. Scherbel
Assistant Examiner—James S. Hogan
(74) Attorney, Agent, or Firm—James Creighton Wray; Meera P. Narasimhan (57) ABSTRACT

The invention relates to a self-compensating drip irrigation emitter. A plurality of novel embodiments are provided, wherein the emitter of the invention is capable of always supplying a substantially constant flow within a range of pressures of a fluid flowing in a pipe (3), from very low to very high pressures. Furthermore, the emitter of the invention has such characteristics as to prevent any accidental and undesired clogging thereof by sediments or debris.

21 Claims, 13 Drawing Sheets

SELF-COMPENSATING DRIP IRRIGATION EMITTER

This application claims the benefit of Italian Application No. SV2001A000012 filed Apr. 20, 2001 and PCT/EP02/0395 filed Apr. 10, 2002.

BACKGROUND OF THE INVENTION

The invention relates to a self-compensating drip irrigation emitter, which comprises a body to be fastened to a pipe, which body has a flat inner surface at the bottom of a cavity, a flexible flat membrane flexibly hung along its perimeter on an annular shoulder above said cavity, the top surface of the membrane being compressed by the fluid flowing in the pipe, and which has an internal central orifice formed inside said flat surface and perpendicular thereto, which orifice communicates with the exterior of the pipe, and which further includes at least one groove, formed in said flat surface, which extends radially outwards from said central orifice to the peripheral edge of said flat surface so that when pressurized fluid is introduced from said pipe inside said emitter, the membrane is resiliently deformed toward the interior of said cavity and against said flat surface, whereas the groove and the internal central orifice operate to limit the flow of the emitter to a substantially constant value, within a range of very low to very high pressures of the fluid flowing in the pipe.

Emitters like those described above are known, which are associated in various manners to a pipe in which a pressurized fluid flows. Any fluid may be provided, but typically fluid is irrigation water, possibly with additives dissolved therein, such as fertilizer agents for plants. As is known, drip irrigation is an optimized irrigation system, particularly in areas where water is scarce. One of the most common and useful applications of drip irrigation is with hilly or anyway highly irregular ground. In this case, the other irrigation methods would require a large amount of water to be consumed, even when water is not available in the required amount. An additional characteristic of drip irrigation pipes is that they may be very long, and still depend on a single water source.

Prior art emitters have various problems, mostly dealing with water pressure. In fact, considerable pressure changes may occur in the pipe because, in the common case of a very long pipe, a very high inlet pressure is required to allow operation of the emitters placed at a long distance therefrom, and to prevent an excessive pressure loss at the end of the line. Moreover, any grades of an irregular ground also cause undesired pressure changes. All these reasons can hinder an even dripping action from all the emitters of the line.

The arrangements proposed to date are Based on embodiments like the one shown in FIGS. 1 to 4. As is described in further detail in the description of the drawings, as the pressure inside the pipe increases, the flexible membrane is elastically deformed, thereby progressively reducing the flow rate at the orifice communicating with the outside. Nevertheless, a groove is provided which, even in the case of very high pressures, should allow a constant minimum water flow from the emitter. However, if pressure is really very high, as it can be at the start of a pipe, the membrane may be excessively deformed to the point of obstructing the groove, thereby preventing or excessively reducing water discharge. An additional drawback consists in that the groove may by clogged by water sediments or debris which may be sucked from the outside due to the siphon effect or reflux effect occurring when releasing pressure from the pipe.

SUMMARY OF THE INVENTION

Therefore, the object of the invention is to obviate all the above drawbacks and provide, by simple and inexpensive arrangements, an emitter which allows a constant water drip even when a wide range of different pressures are present inside the pipe, including very high pressures whose generation might be required or accidental, while preventing total obstruction thereof. Moreover, it is desirable that the dripping action is essentially even all along the pipe. Another object is to provide an emitter having such characteristics that it cannot be easily clogged with sediments or the like. The emitter shall have a totally automatic operation, thereby minimizing servicing needs. Moreover, due to the high cost of the materials in use, it is desired that emitters have a very small size. It shall be noted that a great number, e.g. hundreds or thousands of emitters may be provided along a line.

The invention achieves the above purposes by providing an emitter as described hereinbefore in which the groove, in the end section opening into the internal central orifice, branches into at least two separate end grooves, both opening outwards at the edge of said water outlet orifice. A wall member may be interposed between the two branch grooves.

Advantageously, the wall member interposed between the two branch grooves may have a streamlined shape directed toward the main groove, to allow fluid to flow from the main groove toward the internal central orifice. According to a preferred embodiment of the invention, said member substantially has the shape of a truncated cone or a trapezoid.

The two branch grooves may have equal or different widths to or from each other and/or the main groove. According to a preferred embodiment of the invention, they have the same width at the outlet opening into the central orifice, and lower than the width of the main groove. By this arrangement, the minimum total flow rate of the two branch grooves is substantially unchanged with respect to the flow rate of the main groove, particularly when pressure is very high inside the pipe, so that the membrane is deformed so as to rest on the flat surface and obstruct the central orifice.

The two branch grooves may have equal or different depths to or from each other and/or the main groove. In accordance with a preferred embodiment, they have the same depth as the main groove.

The width of each branch groove may be substantially identical to, but preferably lower than the dimension of the wall member interposed between the two branch grooves, in the circumferential direction of the central orifice.

The wall member may have a flat surface extending level with the inner flat surface at the bottom of the cavity, the membrane being compressed against it by the pressurized fluid. By this arrangement, the membrane has an additional intermediate rest surface at the critical area where the branch grooves open into the central orifice whereby, thanks to the limited width of the outlet area of the grooves, it is actually impossible that the fluid pressure, though high, may deform the membrane to such an extent as to obstruct both branch grooves, and to prevent the dripping action. Moreover, the presence of two channels ensures a better prevention from complete clogging due to sediments or the like.

Advantageously, said flat surface of the wall member interposed between the two branch grooves may extend radially beyond the peripheral edge of the internal central orifice, toward the center thereof.

Alternatively thereto or in combination therewith, said flat surface may extend and/or branch to one or more areas of the orifice edge. As an example only, a grid-like orifice surface might be considered.

Particularly, the flat surface may extend along its longitudinal axis and connect to the diametrically opposite area of the central orifice edge.

According to a preferred embodiment of the invention, the whole wall member interposed between the branch grooves may extend radially beyond the peripheral edge of the internal central orifice, toward the center thereof, and at least partly in the axial direction of said orifice.

Alternatively, the wall member may extend with at least one rib to at least one portion of the orifice wall on the substantially opposite side. Still by way of example, there might be provided a wall member also branching into two or more ribs which may or may not reach the opposite side of the central orifice.

In accordance with an additional preferred embodiment of the invention, the wall member may extend along its own longitudinal axis connecting to the diametrically opposite portion of the central orifice wall.

Thanks to all these arrangements, the rest surface of the membrane on the wall member may be further extended, and the member may be arranged to have a better structural resistance to the pressure exerted thereon by the membrane.

According to a variant embodiment of the invention, the main groove may have one or more branches opening into different portions of the cylindrical surface which delimits the central orifice.

A preferred embodiment of the invention may provide that the main groove has, in a substantially intermediate portion between the outer peripheral edge of the flat surface and the edge of the central orifice, a pair of branches extending along an arc of a circle and in opposite directions with respect to the longitudinal axis of the main groove. Said branch grooves open into the central orifice at two diametrically opposite locations, arranged along an axis perpendicular to the longitudinal axis of the main groove. Here again, the presence of two branches reduces the possibility of flow interruption when the membrane is subjected to a strong pressure. Obviously, the branch grooves may be provided in a greater number and with a different profile from the one described above.

According to an additional embodiment of the invention, on at least one of the two lateral portions directly adjacent to the edge of the groove formed in the flat surface or possibly at a certain distance therefrom, there may be provided an extension of said flat surface inwards toward the center of the central orifice, which may consist of a thin projecting surface extension of the flat surface.

Nevertheless, said extension may advantageously be a rib also extending at least partly in the axial direction of the orifice, still for the purpose of having a higher structural resistance. Said extension may be obtained by providing an orifice whose peripheral inner surface has a substantially 360° spiral-shaped profile, the two opposite ends of the spiral wall being joined together by an additional wall portion.

The spiral wall of the central orifice may have a rounded or polygonal or stepped surface.

Said joining wall portion may be parallel and/or coincident and/or form an extension of one of the two side walls of the groove. This embodiment of the invention also allows to advantageously increase the rest surface for the membrane in the portion whereat the groove opens into the central orifice, while preventing the membrane from being excessively deformed and from obstructing the groove.

According to an additional embodiment of the invention, the depth of the groove may increase progressively toward the central orifice. Particular the bottom wall may have one or more lowered steps.

Further, the groove may progressively taper toward the central orifice. Particularly, one or both side walls of the groove may have one or more groove tapering steps.

The progressive taper of the groove allows to avoid the main drawback of prior art embodiments, i.e. the excessive deformation of the membrane under pressure, and the penetration thereof inside the groove, resulting in flow occlusion. On the other hand, the simultaneous progressive lowering of the bottom wall allows to maintain the opening of the groove, and as a result the minimum water flow substantially constant as desired.

With reference to all the above embodiments, the membrane may be made of a relatively soft and flexible material.

The emitter may be of the type attached and/or soldered inside a pipe, and extending peripherally substantially all along the inside circumference thereof.

Alternatively, the emitter may be of the type attached and/or soldered on one side inside the pipe, and extending peripherally for a portion of the inside circumference thereof.

As a further alternative, the emitter may be of the type attached and/or soldered on the outer surface of a pipe, and having at least one appendix for communicating with the interior of the pipe.

Advantageously, such means may be provided that the pressure exerted on the membrane face in direct contact with the fluid flowing inside the pipe is always higher than or equal to the pressure exerted on the opposite face. Particularly, it is desirable that the latter pressure is equal when the fluid pressure inside the pipe is very low, for instance at the ending portion of a very long pipe or in a climbing portion, and that said pressure is much lower when the pressure of the fluid flowing inside the pipe is very high, e.g. at the starting portion of a pipe or in a sloping portion thereof, to allow the deformation of the membrane toward the inside of the cavity.

The advantages of this invention are apparent from the above description and have been already mentioned with reference to the various embodiments. The great construction simplicity of the various embodiments as provided is still to be mentioned, as well as the low manufacturing cost thereof. Also, all the embodiments have the advantage of limiting the deformation of the membrane, and hence, any damage thereto occurring with time, such as scratches or the like over the surface thereof, caused by excessive bending.

The further characteristics and possible improvements of the invention will form the subject of the dependent claims.

The characteristics of the invention and the advantages derived therefrom will appear more clearly from the following detailed description of the accompanying figures, in which:

DETAILED DESCRIPTION OF THE PREFERRED EMBODIMENTS

Figure 1:
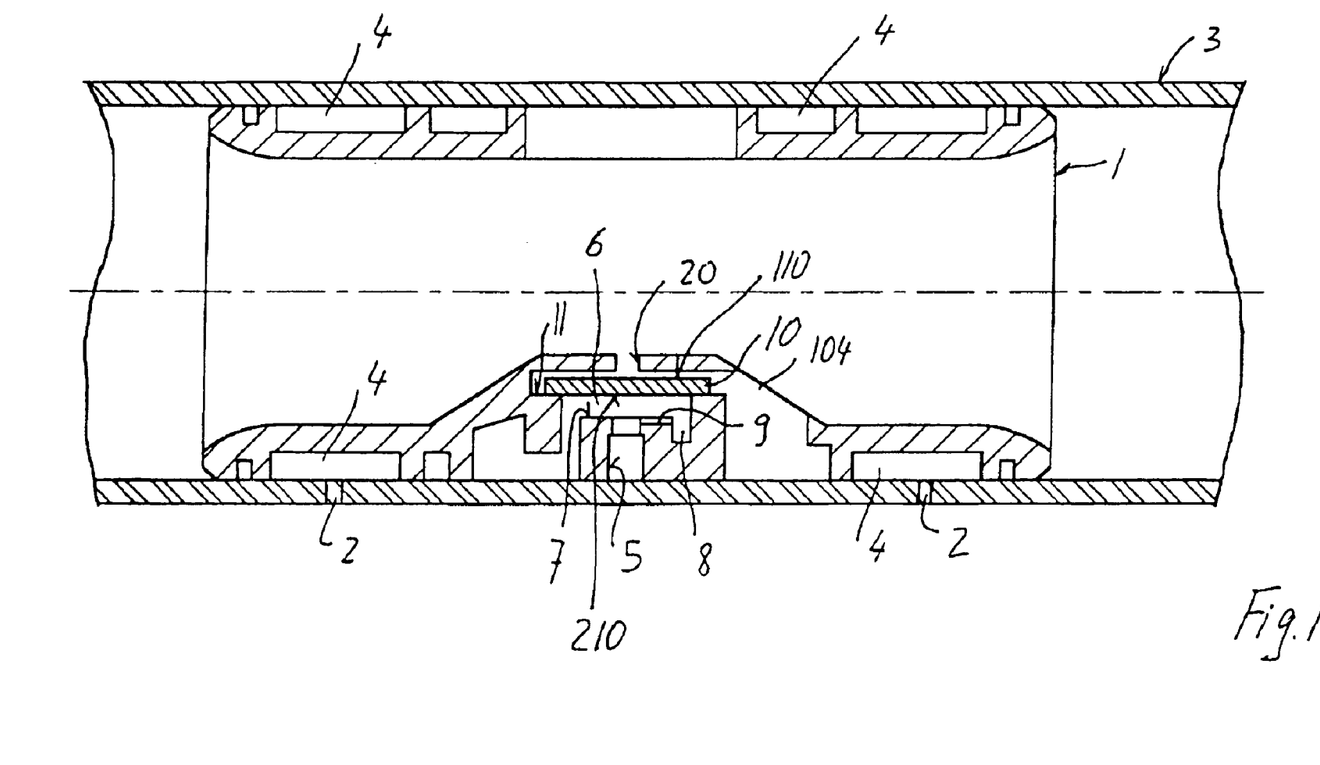
FIGS. 1 to 4 are different views of a prior art self-compensating emitter.

With reference to FIG. 1, a prior art emitter is shown of the type attached and/or soldered inside a pipe 3, and extending peripherally substantially all along the inside circumference thereof.

The emitter has a body 1 with a central orifice for discharging fluid, particularly irrigation water. The orifice 5 allows water to reach the outlet orifices 2, via a number of channels.

An internal central cavity 6 is provided above the discharge orifice 5. At the bottom of the cavity 6 a flat surface 7 is provided around the orifice 5. A chamber 8 is further provided, which extends around the perimeter of the surface 7. This chamber 8 communicates with the interior of the pipe via a number of labyrinth channels which communicate with the interior of the pipe 3 via an aperture 104. The labyrinth channels are subject to turbulent motion and, when needed, reduce pressure inside the cavity 6 with respect to the pressure of the fluid flowing in the pipe 3, as is known from the art. The pressure of fluid inside the pipe is exerted on the top face 110 of the membrane 10 via an orifice 20 and/or the aperture 104. Hence, the pressure exerted on the top face 110 of the membrane 10 is always higher then or equal to the pressure exerted on the bottom face 210, as will be described in greater detail below. The orifice 5 allows the outlet orifices 2 to communicate with each other via channels 4.

The flat surface 7 has a horizontal shallow groove 9 which extends radially outwards from the discharge orifice 5 to the peripheral chamber 8 along the edge of the surface 7.

The above mentioned flexible membrane 10 is provided above the cavity 6, and is hung along its periphery on an annular shoulder 11, or the like, which is provided within the emitter body 1. The membrane 10 wholly covers the cavity 6 and has such flexibility properties as to allow a resilient deformation thereof, toward the interior of said cavity 6. The distance between the flat surface 7 and the annular shoulder 11 defines the height of the cavity 6 and provides a space below the membrane 10 which is sufficiently wide as to allow discharge of any possible debris through the orifice 5.

Figure 2:
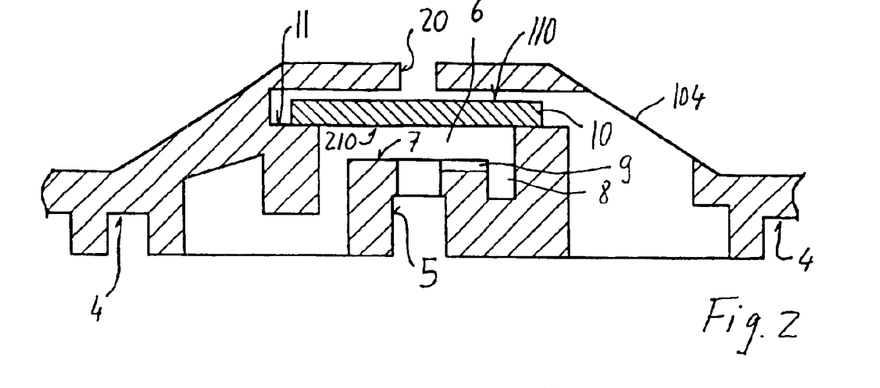
Figure 3:
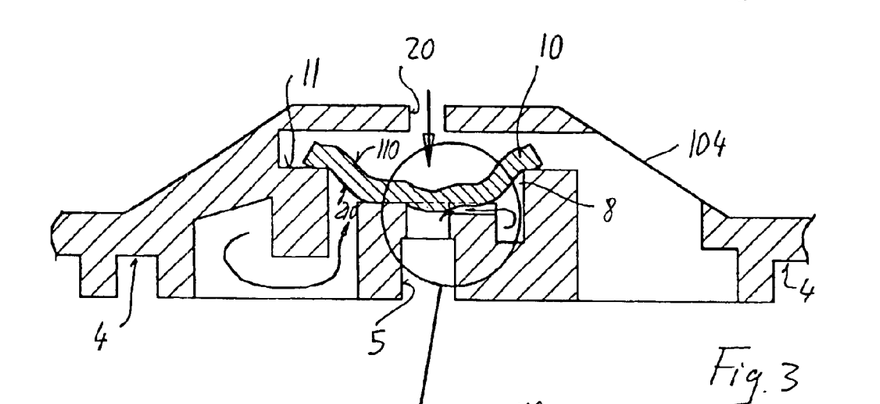
Figure 4:
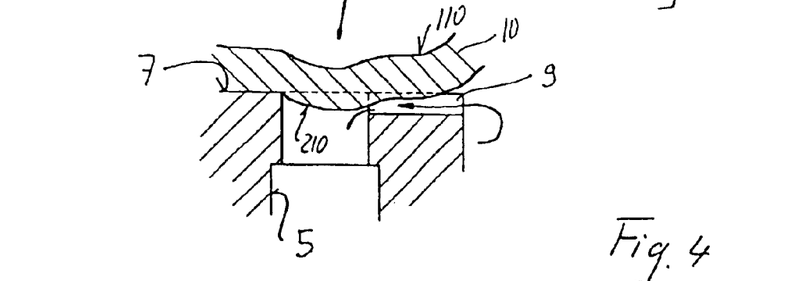

Referring now to FIG. 2, when the pressure of the fluid flowing inside the pipe 3 is low, the pressure stress on the top face 110 of the membrane 10 which is in direct contact with the fluid is substantially equal to the pressure stress on the bottom face 210 which is in contact with the fluid inside the cavity 6, whereby the membrane 10 is only slightly deformed or not deformed at all, and the fluid flows into the cavity 6 through the aperture 8, to be slowly discharged outside through the orifice 5.

Nevertheless (FIGS. 3 and 4), as pressure inside the pipe 3 increases, a pressure difference is generated between the pressures exerted on the bottom face 210 and on the top face 110 of the membrane 10, the latter being higher than the former, whereby the membrane 10 is elastically deformed toward the interior of the cavity 6, thereby resting on the flat surface 7 and obstructing the central orifice 5. However, the presence of the groove 9 prevents the membrane 10 from wholly stopping the fluid flow, which may flow outside in a controlled and predetermined amount. Nevertheless, as is clearly shown in FIG. 4, when pressure inside the pipe 3 is really high, the deformation of the membrane 10 may be such as to allow it to penetrate at least partly inside the groove 9 and to wholly stop or excessively limit the fluid passage (as shown from the smaller arrow).

This invention, through its different embodiments, provides a solution to this problem and prevents, even in very high fluid pressure conditions inside the pipe, the groove from being completely obstructed 9. The invention relates to a part of FIG. 1, i.e. to the emitter, which is improved.

Figure 5A:
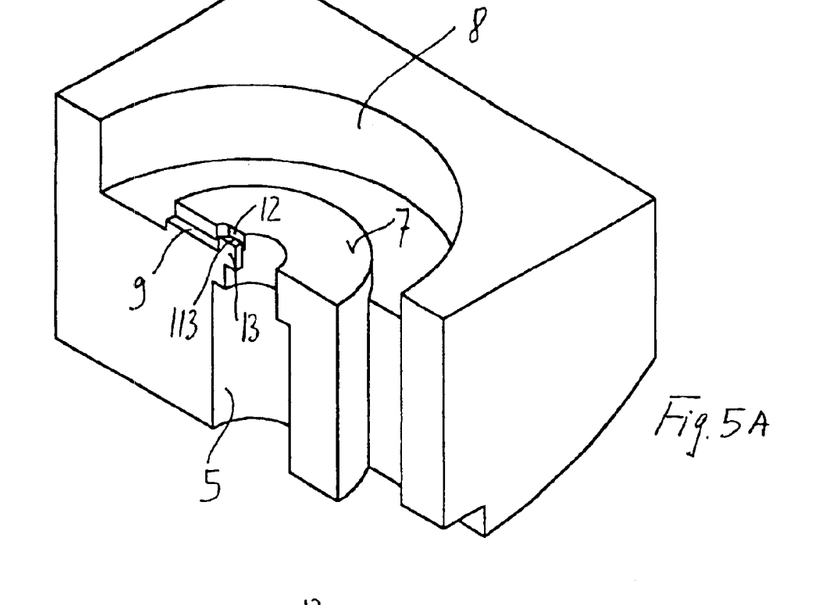
FIG. 5 is a perspective and sectional view of a detail of a first embodiment of the inventive emitter, the membrane being omitted.
Figure 5B:
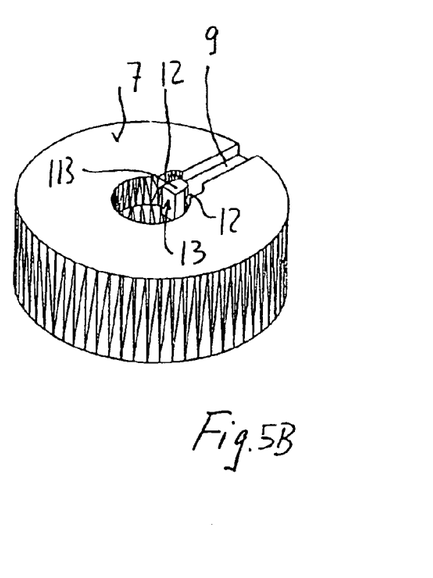
Figure 6:
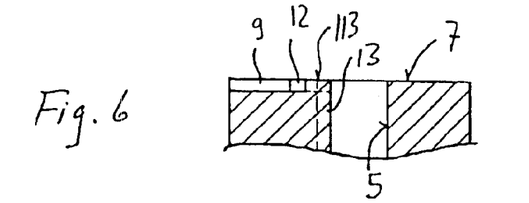
FIG. 6 is a sectional view of a detail of FIG. 5 showing the central water discharge orifice and the groove.
Figure 7:
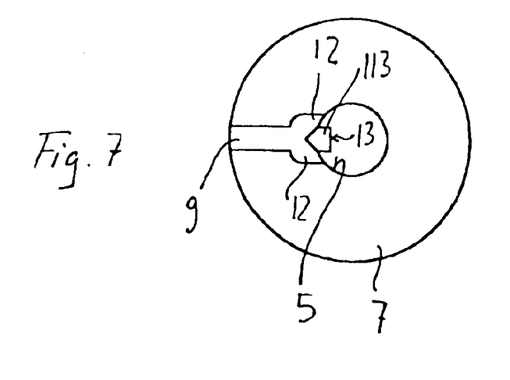
FIG. 7 is a top plan view of the detail as shown in FIG. 6.

A first arrangement is shown in FIGS. 5 to 7, relating to a first embodiment of the invention. In this case, in the ending section opening into the water discharge orifice 5, the groove 9 branches into two separate end grooves 12, both opening out at the edge of said orifice 5. A wall member 13 is interposed between the two branch grooves 12 which has a streamlined shape directed toward the main groove 9, and such as to allow water to flow toward the central orifice 5. This wall member 13 extends radially to a certain extent beyond the peripheral edge of the orifice 5 toward the center thereof and, still to a certain extent, in the axial direction of said orifice 5.

Figure 25:
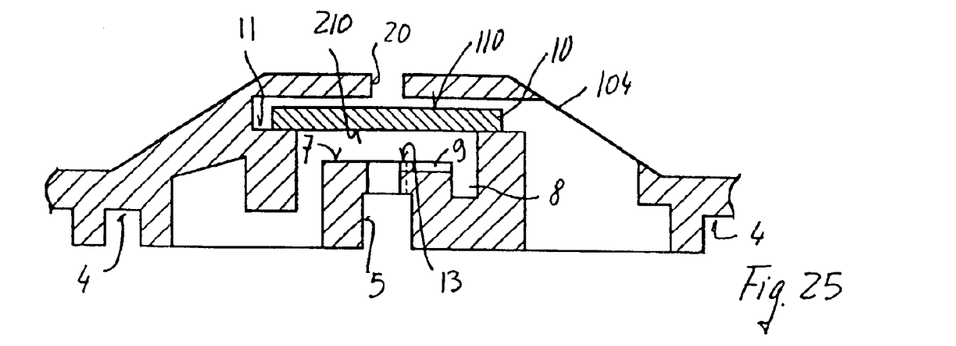
FIGS. 25 to 27 are longitudinal sectional views of the emitter as shown in FIG. 5, and show the behavior thereof in a very low fluid pressure condition (FIG. 25) and in a very high fluid pressure condition (FIGS. 26 and 27).
Figure 26:
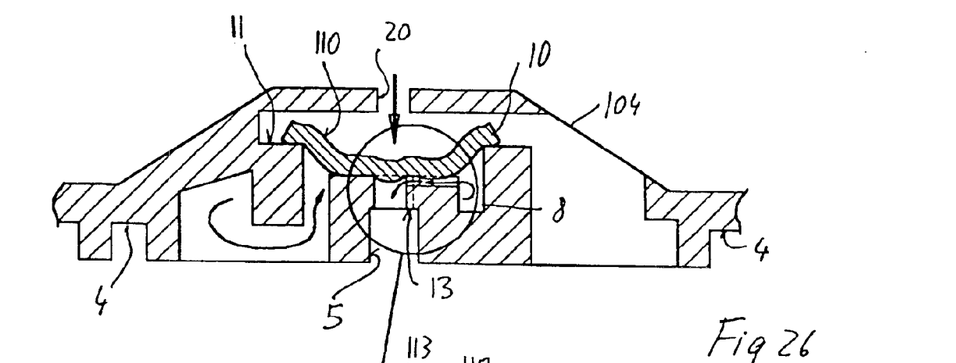
Figure 27:
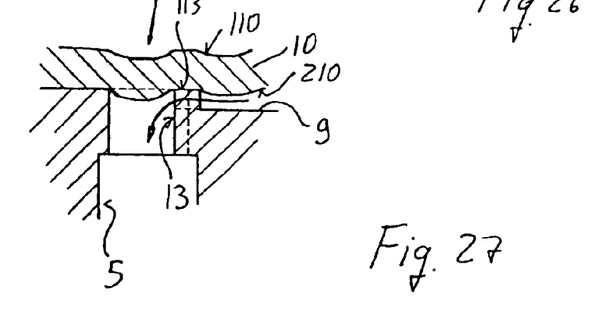

The wall member 13 has a top flat surface 113, which extends level with the flat surface 7 and, in very high pressure conditions, acts as a membrane rest member, at the critical area whereat the two branch grooves 12 open into the orifice 5, thereby preventing occlusion thereof. The principle is better explained in FIGS. 25 to 27. FIG. 25 shows the above described low fluid pressure condition. As pressure increases (FIGS. 26 and 27), the membrane 10 is deformed toward the interior of the cavity 6, as in the above described prior art case but, in the area coinciding with the outlets of the branch grooves 12 into the discharge orifice 5, it rests on the flat top surface 113 of the wall member 13, whereby it cannot obstruct the two branch grooves 12, and always allows a minimum water flow, as desired. To this end, it shall be noted that the branch grooves 12 are as deep as the main groove 9, whereas the width of their outlets into the orifice 5 is lower than the width of the main groove 9. This arrangement allows a substantial equivalence between the sum of the openings of the two branch grooves 12 and the opening of the main groove 9, hence between minimum flows, while limiting the possibility that the membrane 10 may penetrate the branch grooves 12.

Figure 8A:
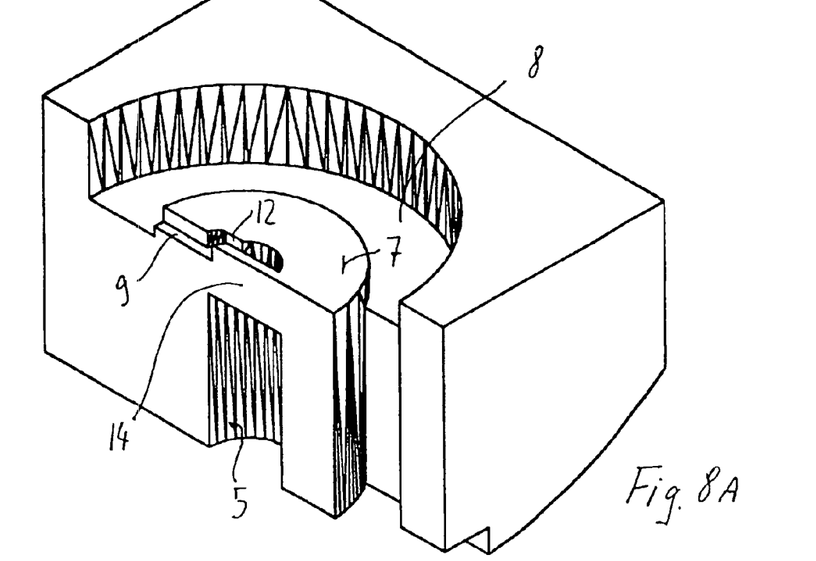
FIGS. 8 to 10 are the same views as FIGS. 5 to 7, with reference to a second embodiment of the invention.
Figure 8B:
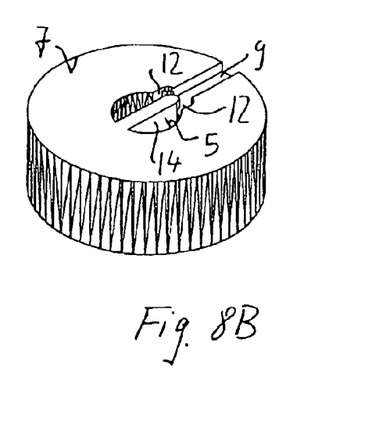
Figure 9:
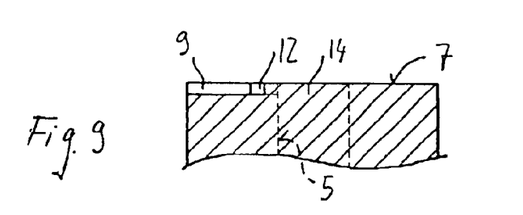
Figure 10:
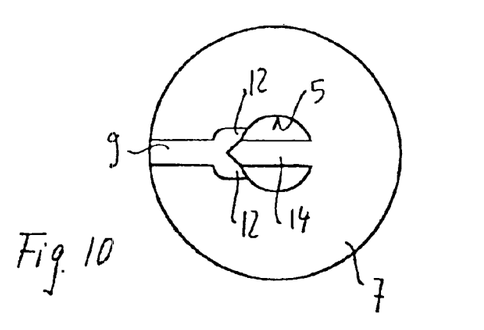

In accordance with an advantageous improvement as shown in FIGS. 8 to 10, illustrating a second preferred embodiment of the invention, the wall member 13 extends along its own longitudinal axis with a rib 14 connected to the diametrically opposite portion of the wall of the orifice 5, thereby dividing the upper aperture of the orifice 5 substantially into two halves. Thanks to this arrangement, the structural strength of the wall member 13 is increased, and an effective support is created for the membrane 10, not only in the critical portion of the branch grooves 12, but also at the upper aperture of the orifice 5, thereby preventing the membrane 10 from being excessively deformed therein.

Advantageously, the wall member 13 may be made in one piece with the rest of the emitter body 1. The two embodiments as described above may have variants. For instance, the axial extension of the wall member 13 may be arranged to be at least partly limited to its flat top surface 113. In this case, this would be a thin extension, projecting or connected to the diametrically opposite end of the edge of the orifice 5. Alternatively, the wall member 13 might be arranged to also branch into one or more members which may or may not reach the opposite wall of the orifice 5. As an example, a star- or grid-like member might be provided.

Figure 11A:
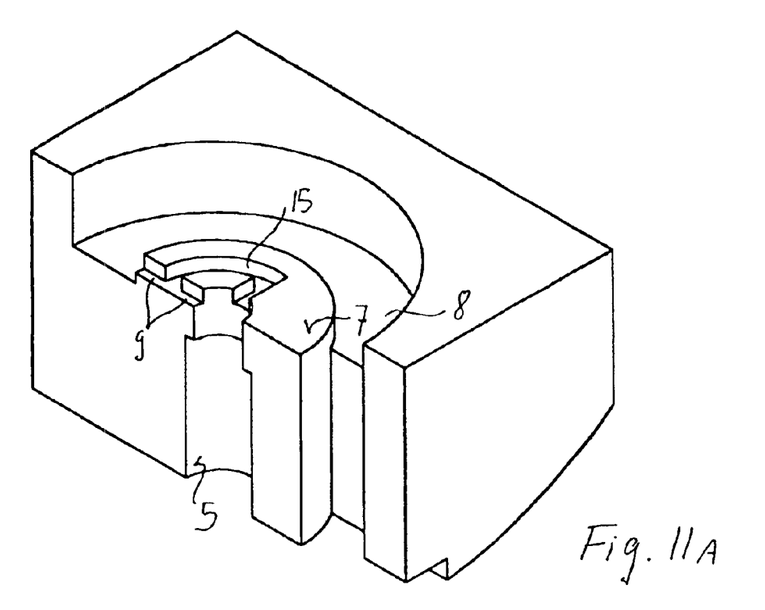
FIGS. 11 to 13 are the same views as FIGS. 5 to 7, with reference to a third embodiment of the invention.
Figure 11B:
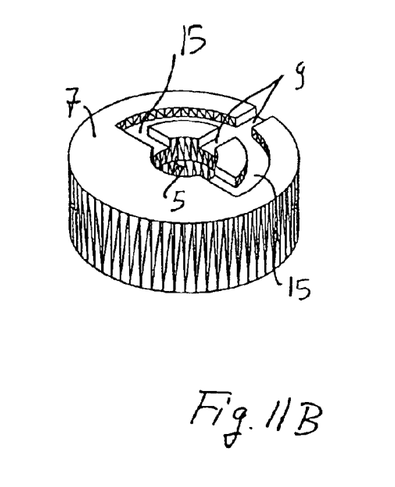
Figures 12, 13:
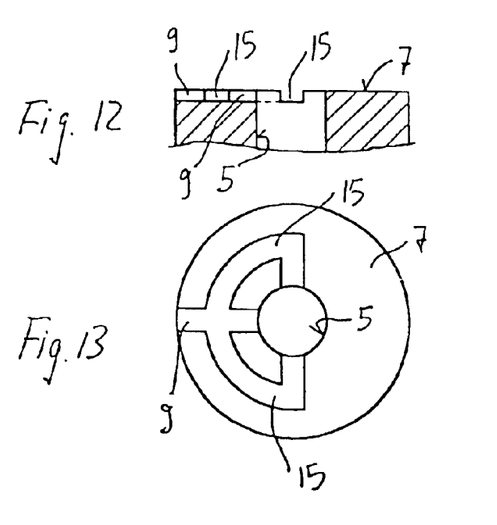

Referring now to FIGS. 11 to 13, a third embodiment of the emitter according to the invention is shown, in which the main groove 9 has two branches 15 which extend along an arc of a circle and in opposite directions with respect to its longitudinal axis, and open into the central orifice 5 at two diametrically opposite areas, disposed along an axis perpendicular to the longitudinal axis of the main groove 9. In this case, the main groove 9 and the two branches 15 have the same depth and the same width. When fluid pressure is very high, and the membrane 10 is strongly deformed, a flow rate reduction may be expected as described for prior art. Nevertheless, three outlets into the central orifice are provided, not one like in prior art, so that the minimum flow may be maintained to a substantially constant value. Obviously, the branches 15 may be provided in a greater number and/or with an at least partly different profile from the one described above.

Figure 14A:
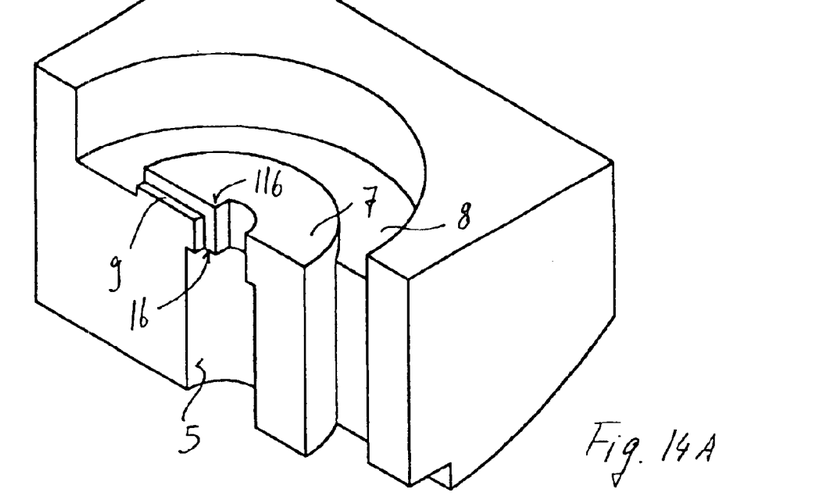
FIGS. 14 to 16 are the same views as FIGS. 5 to 7, with reference to a fourth embodiment of the invention.
Figure 14B:
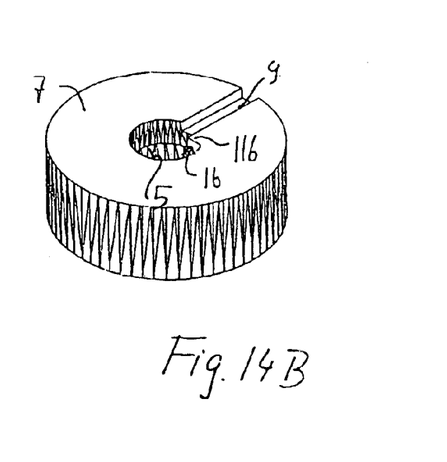
Figure 15:
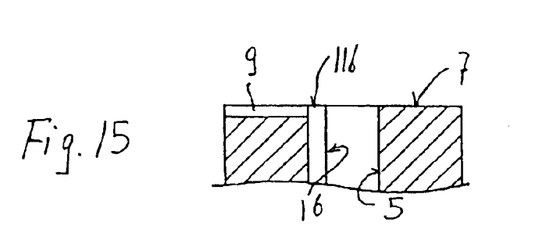
Figure 16:
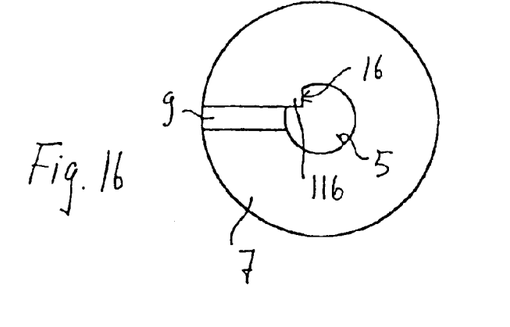

FIGS. 14 to 16 show a fourth embodiment of the inventive emitter wherein an extension 116 of the flat surface 7 toward the interior of the central orifice 5 is provided on one of the two side portions directly adjacent to the edge of the groove 9, which extension consists of a rib 16 which also extends at least partly in the axial direction of said orifice 5. Although the groove 9 essentially has the same characteristics as the groove 9 described in prior art, the upper surface 116 of the rib element 16 advantageously forms an additional support and bearing member for the membrane 10 in the outlet portion of the groove 9 at the edge of the orifice 5, thereby preventing the groove 9 from being obstructed and allowing a constant minimum flow.

Figure 17A:
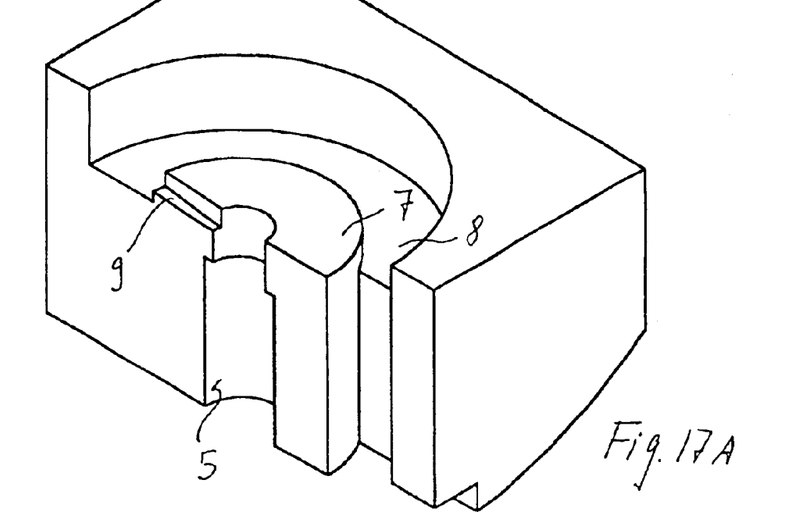
FIGS. 17 to 19 are the same views as FIGS. 5 to 7, with reference to a fifth embodiment of the invention.
Figures 17B, 18, 19:
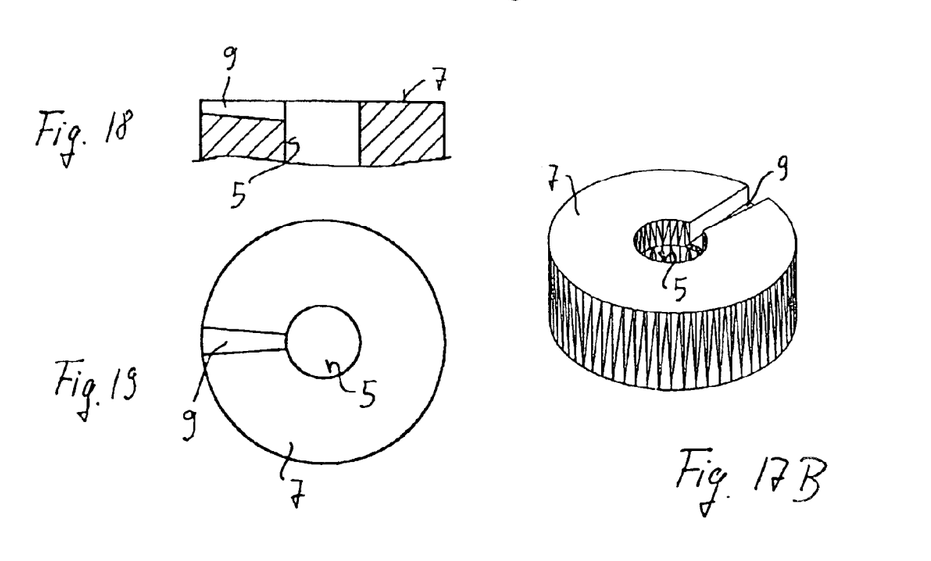

Referring to FIGS. 17 to 19, a fifth embodiment of the inventive emitter is shown, wherein the groove 9 has a width that progressively tapers toward the central orifice 5. Thanks to this arrangement, the membrane 10, although subject to very high pressures, cannot penetrate the groove 9, especially in the proximity of the outlet thereof into the central orifice 5. Nevertheless, it shall be noted that the depth of the groove 9 increases progressively toward the central orifice 5, in such a manner as to ensure a substantially constant opening of the groove 9, hence a substantially constant minimum water flow.

Figure 20A:
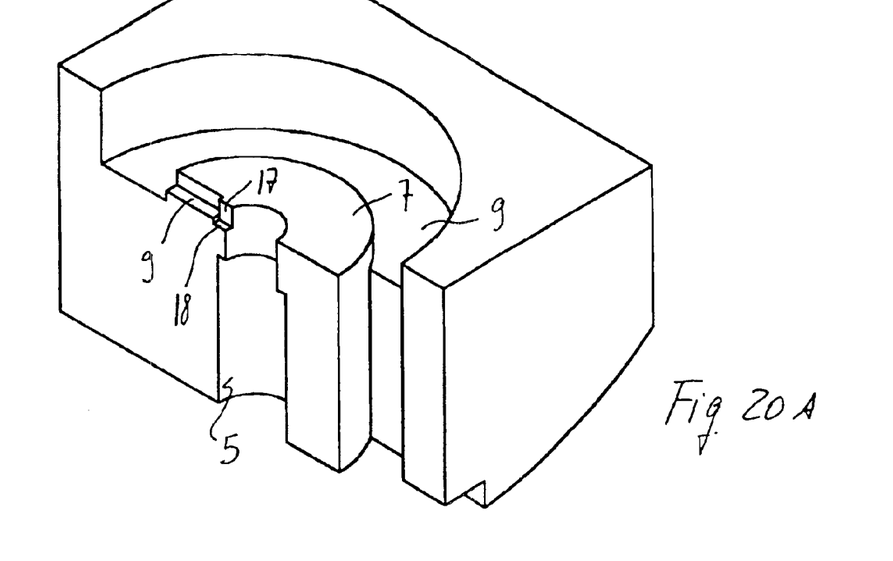
FIGS. 20 to 22 are the same views as FIGS. 5 to 7, with reference to a sixth embodiment of the invention.
Figure 20B:
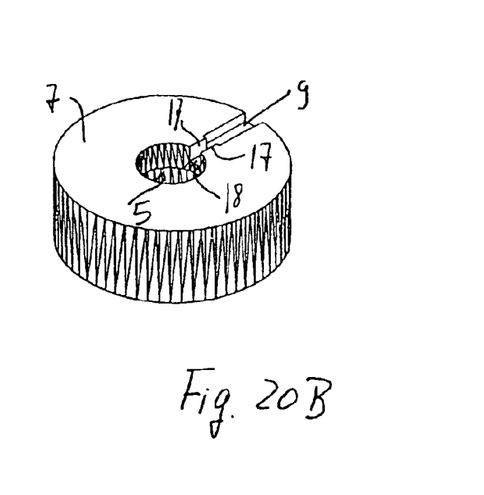
Figure 21:
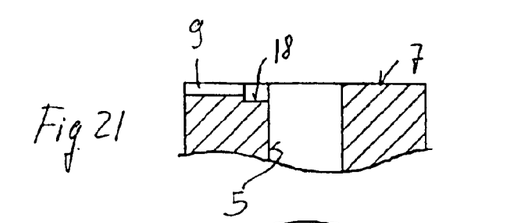
Figure 22:
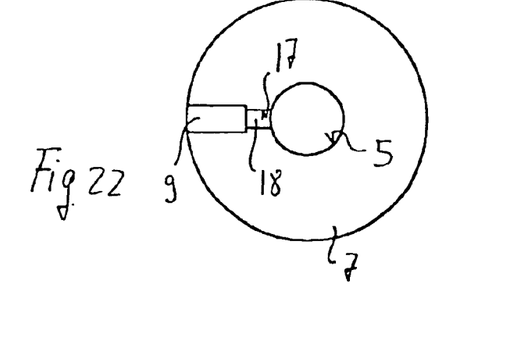

FIGS. 20 to 22 show a sixth embodiment, wherein the groove 9 is tapered by providing each side wall thereof with a step in the proximity of the outlet into the central orifice 5, which step extends inside the groove 9 and reduces the opening thereof. Thanks to this arrangement, the membrane 10 cannot penetrate the groove 9, particularly at the outlet into the orifice 5. On the other hand, the bottom wall of the groove 9, substantially in the same portion, has such a lowered step 18 that the opening of the groove 9, hence the minimum discharged fluid is substantially constant.

The arrangements as described and illustrated above with reference to a specific emitter type may be also advantageously used for emitters of other types, particularly of smaller emitters, to be attached and/or soldered on one side of an inner portion of the pipe 3, and not extending peripherally all along the orifice inner surface. Alternatively, they can be used for external emitters which communicate with the interior of the pipe 3 via one or more appendices fitting into the peripheral wall of the pipe 3.

Figure 23:
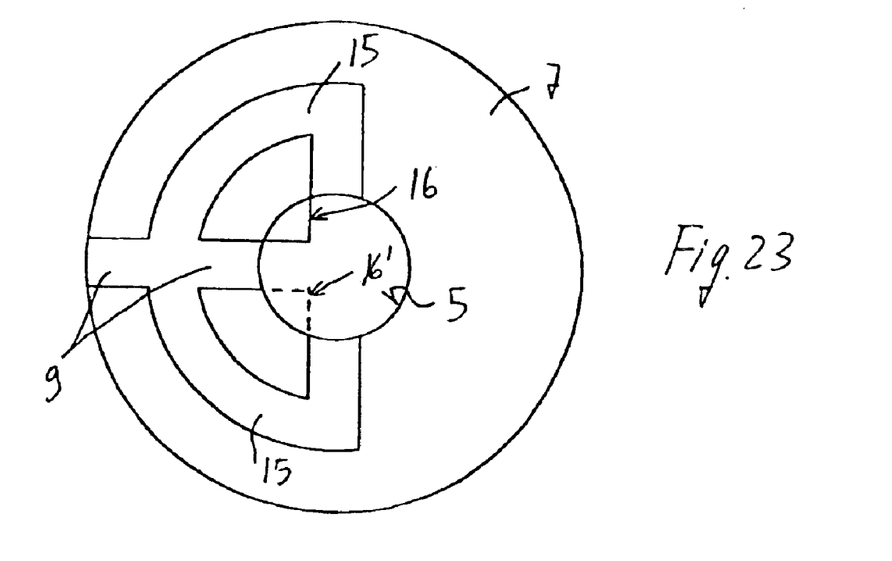
FIGS. 23 and 24 are top plan views of a detail or two further possible embodiments of the inventive emitter.
Figure 24:
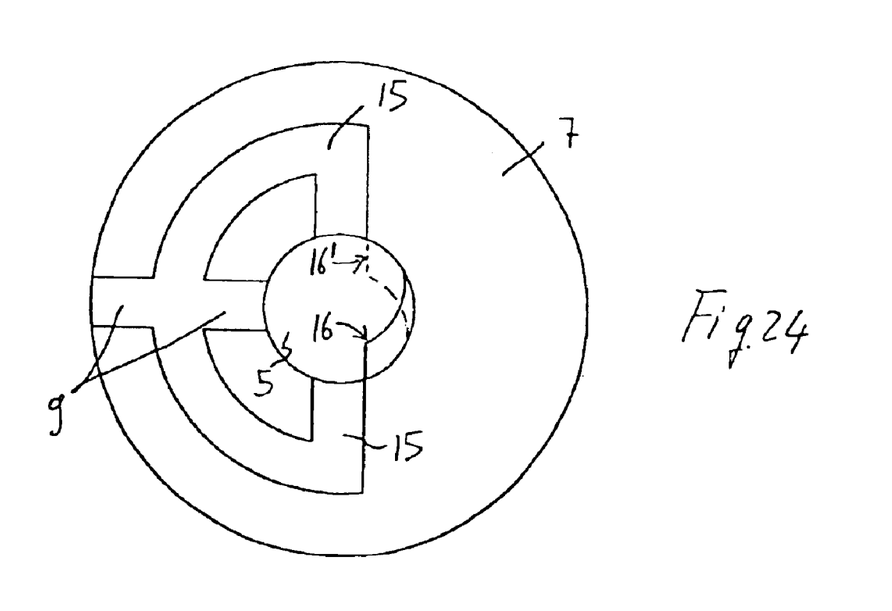

Obviously, the invention is not limited to the embodiments described and illustrated herein but may be greatly varied. While the characteristics of the various embodiments are not specifically described in combination with each other, but only in combination with a few embodiments, they may be freely combined with one other. For instance (FIG. 23), in one or more of the above described embodiments, an additional rib 16' for extending the flat surface 7 may be provided, having the characteristics as described in FIGS. 14 to 16, at the other side portion, directly adjacent to the edge of the groove 9, to obtain a pair of elements 16, 16' for supporting the membrane 10 at the outlet of the groove 9 into the orifice 5. Alternatively to or in combination with one or more of the above described embodiments, the upper edge of the orifice 5 or the whole inner wall thereof may be arranged (FIG. 24) to have a profile that is not circular but, for instance, spiral-shaped. Particularly, in the example of FIG. 24, the wall of the orifice 5 substantially has a 360° spiral profile (continuous line), and the two opposite ends of said spiral wall are connected to each other by an additional portion of the wall, which forms the extension of a side wall of one of the two branches 15 of the main groove 9. Here again the surface for supporting the membrane 10 at the outlet portion of one of the, branch grooves 15 into the central orifice 5 may be advantageously extended. The dashed line highlights the possibility for this arrangement to also relate to the groove 15 disposed in the diametrically opposite position. Another possibility may consist in that in the embodiment of FIGS. 11 to 13, the main groove 9 and/or one or both the branch grooves 15 have, in combination with the above, the characteristics of the embodiment as shown in FIGS. 17 to 19 and/or of the embodiment as shown in FIGS. 20 to 22.

Figure 28:
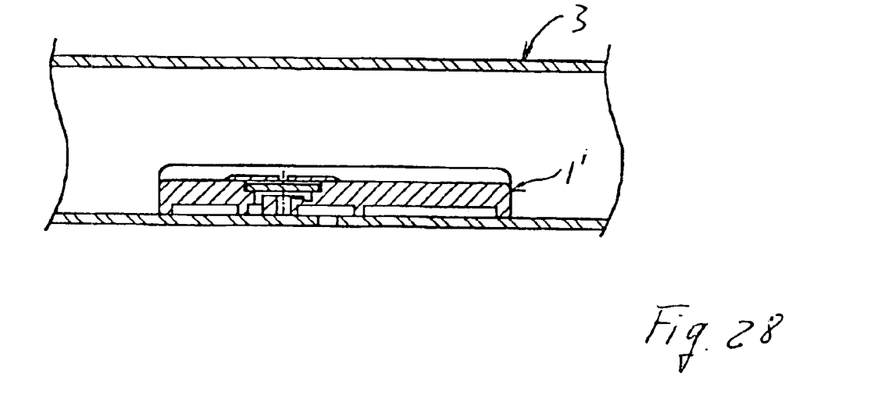
FIG. 28 is a sectional view as taken through an axial plane of another variant embodiment of the invention in the form of a dropper inside the pipe.
Figure 29:
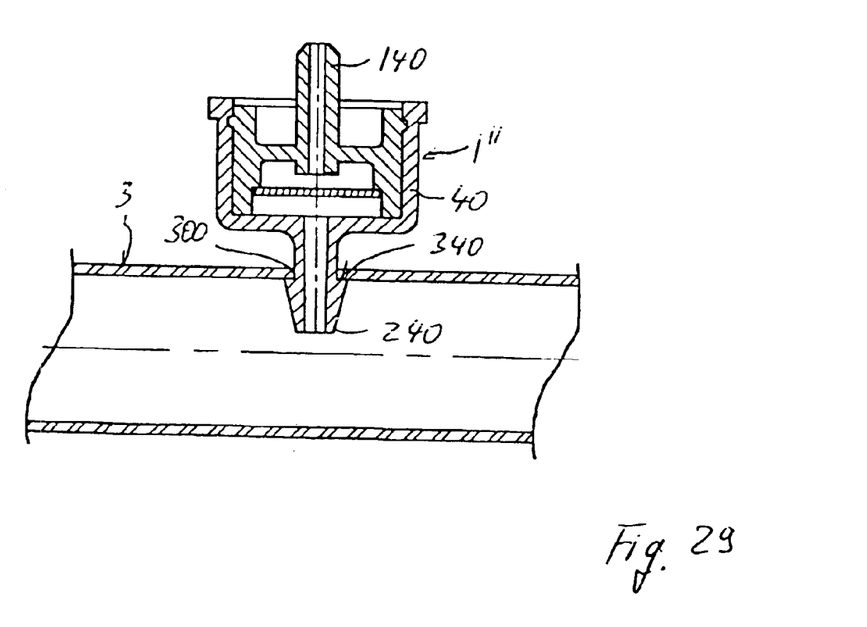
FIG. 29 is the same view as FIG. 28, wherein the dropper is provided outside the pipe and communicates therewith by a fitting spout.
Figure 30:
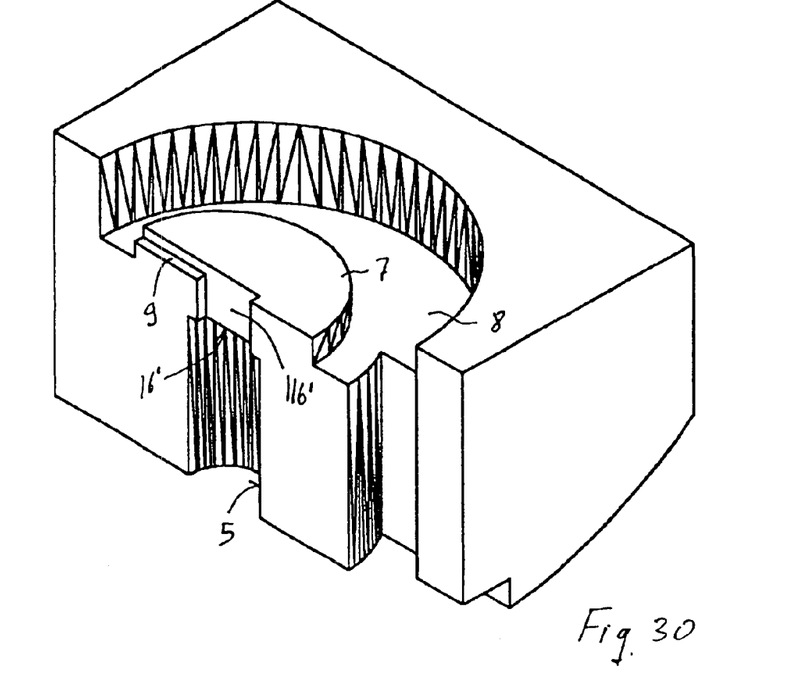
FIGS. 30, 31, 32, 33 are the same views as FIGS. 5 to 22, of another embodiment of the invention.
Figure 31:
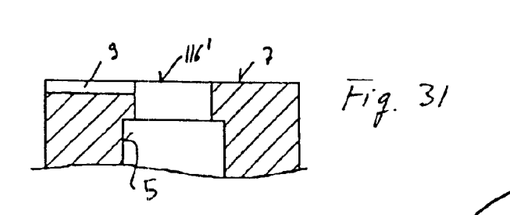

Furthermore, referring to FIGS. 28 and 29, the latter show two different variant embodiments of the dropper as shown in the previous figures, wherein said dropper differs for the construction of the body thereof. However all the above illustrated and described construction variants are provided for said variants of the dropper.

The dropper 1' as shown in FIG. 28 is of the internal type. Nevertheless, the dropper body does not have a cylindrical extension, such as to adhere against the whole inner surface of the pipe 3, but has a limited angular extension and is attached to a portion of the inner surface of the pipe wall. This dropper is substantially provided as a bar which has a predetermined length and whose side adhering against the inner surface of the wall of the pipe 3 has an arched section in the form of a circular sector.

Conversely, the dropper 1" as shown in FIG. 29 is of the external type and has an enclosure 40 including a dripping outlet 140 and an inlet spout 240 to be fitted in a orifice 300 of the pipe. Particularly, the spout 240 has a conical head which forms an annular shoulder 340 and cooperates for holding the spout 240 inside the orifice 300 against removal thereof. The spout may be inserted by force fitting it in the orifice of the pipe wall, which adheres in a water tight manner against the spout thanks to the intrinsic resilience of the material of the pipe and/or of the spout.

Referring to the example of FIGS. 30 to 34, the latter is a variant of the example as shown in FIGS. 14A to 16. In this case, the flat wall 7 is extended on at least one side of the groove 9 to the edge of the orifice 5 opposite to the groove 9. This extension 116' may be provided either on both sides as shown in FIGS. 30 to 34, or on one side only, or alternatively the extension of the wall 7 is partial on one of the sides, i.e. does not extend until reaching the diametrically opposite portion of the orifice 5 (like in the embodiment as shown in FIGS. 14A to 16).

When two extensions 116' are provided, like in FIGS. 30 to 34, then the orifice 5 is throttled to have the same width as the groove 9. Moreover the thickness of the extensions in the axial direction may be of the same order as the depth of the groove 9 or even greater.

The extension may also be discontinuous and form cross patterned throttled apertures or apertures formed by a plurality of crossed slots. An example thereof may consist in providing four extensions 116 like those as shown in FIGS. 14A to 16, arranged in such a manner as to create an aperture of the orifice 5 at the cross-shaped surface 7.

Figure 32:
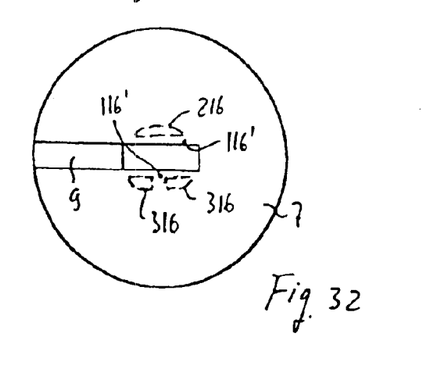
Figure 33:
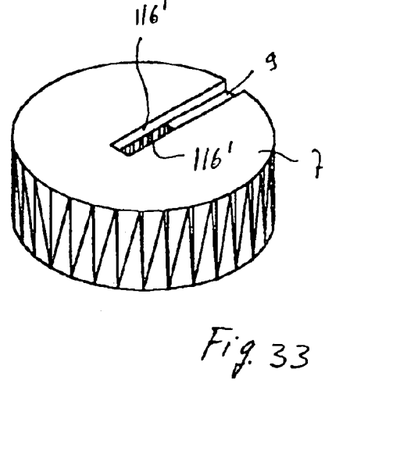
Figures 34, 35, 36, 37:
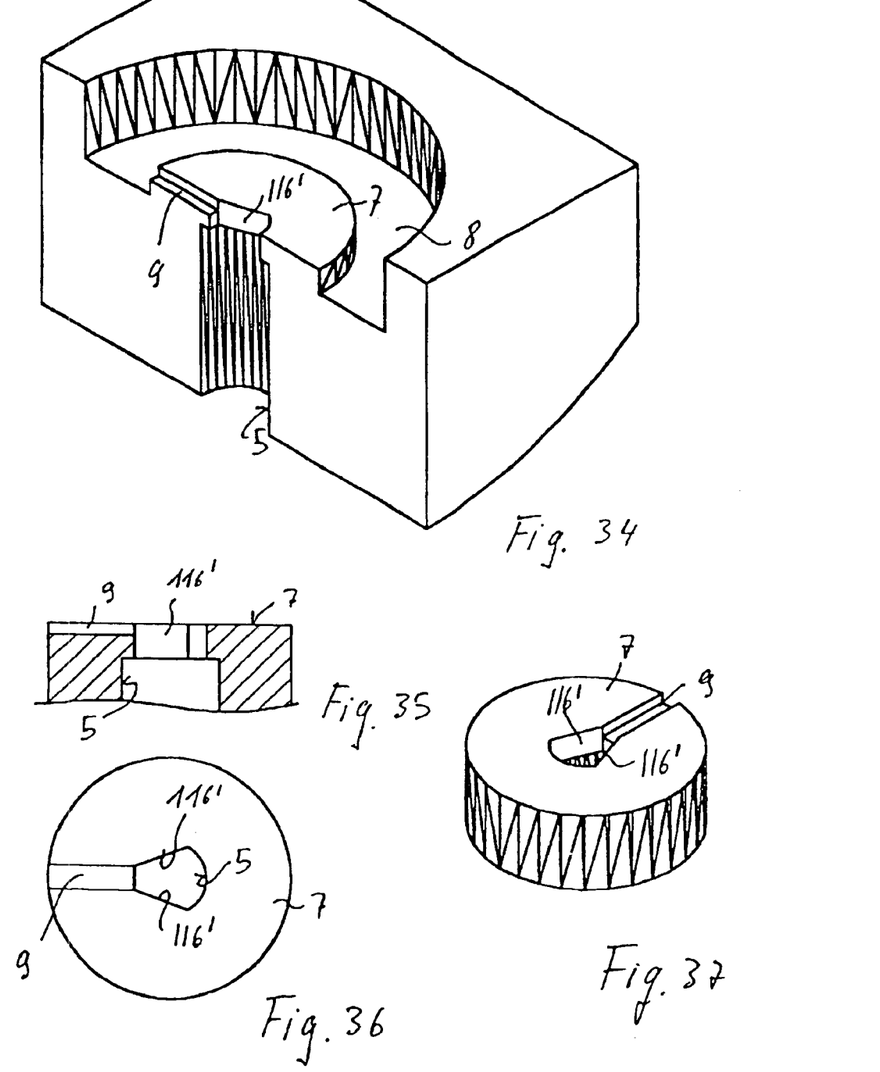
FIGS. 34, 35 and 36, 37 are the same views as FIGS. 30 to 34, of a variant of the embodiment shown by the latter.

Also, alternatively thereto or in combination therewith, the extensions may have one or more through orifices or apertures in the portion coinciding with the orifice 5 as shown by dashed lines in FIG. 32 with 216', 216".

The extensions may be shaped in any manner, e.g. to form a sort of grid consisting of intersecting ribs which connect diametrically opposite portions of the peripheral wall of the orifice 5.

Moreover, as shown in FIGS. 34 to 37, the extensions 116' may have non-parallel walls for delimiting the aperture of the orifice 5, for instance diverging or converging for at least a part of their extension. In this case, said extensions are divergent and connect the corresponding side edge of the groove 9 with an opposite point of the peripheral wall of the orifice 5, which is not exactly diametrically opposite, i.e. coincident with the intersection of a plane parallel to the diameter of the orifice 5. The aperture generated thereby has a trapezoidal shape, the greater base side being a portion of the wall of the orifice 5 delimited by the side walls of the two extensions 116'.

It shall be further understood that the characteristics of this embodiment my be provided in combination with any further compatible characteristic of the other embodiments as illustrated and described above. Hence, for example and without limitation, in combination with the characteristics of the embodiments as shown in FIGS. 30 to 37, there may be provided one or more branches of the groove 9, as shown in FIGS. 11A to 13, or separately therefrom or in combination therewith, the characteristics as shown in FIGS. 17A to 19 or 20A to 22, wherein the groove has a variable depth, and/or separately from or in combination with one or more above mentioned characteristics, there may be provided the characteristics of the example as shown in FIGS. 5A to 7.

All this without departure from the guiding principle disclosed above and claimed below.

What is claimed is:

1. A self-compensating drip irrigation emitter, which comprises a body to be fastened to a pipe, which body has a flat inner surface at the bottom of a cavity, a flexible flat membrane flexibly hung along its perimeter on an annular shoulder above said cavity, the top surface of the membrane being compressed by the fluid flowing in the pipe, and which has an internal central orifice formed inside said flat surface and perpendicular thereto, which orifice communicates with the exterior of the pipe, and which further includes at least one groove, formed in said flat surface, which extends radially outwards from said central orifice to the peripheral edge of said flat surface so that when pressurized fluid is introduced from said pipe inside said emitter, the membrane is resiliently deformed toward the interior of said cavity and against said flat surface, whereas the groove and the internal central orifice operate to limit the flow of the emitter to a substantially constant value, within a range of very low to very high pressures of the fluid flowing in the pipe, wherein the groove, in the end section opening into the internal central orifice, branches into at least two separate end grooves, both opening outwards at the edge of said orifice, a wall member being interposed between the two branch grooves.

2. An emitter as claimed in claim 1, wherein the wall element interposed between the two branch grooves has a streamlined shape directed toward the main groove, and such as to allow fluid to flow from the main groove to the internal central orifice and particularly substantially has the plan shape of a cone, a wedge, a truncated cone or a trapezoid.

3. An emitter as claimed in claim 1, wherein the two branch grooves have equal or different widths to or from each other and/or the main groove, and particularly have the same width at the outlet opening into the central orifice, and lower than the width of the main groove.

4. An emitter as claimed in claim 1, wherein the two branch grooves have equal or different depths to or from each other and/or the main groove, and particularly both have the same depth as the main groove.

5. An emitter as claimed in claim 1, wherein the width of each branch groove may be substantially identical to, but preferably lower than the dimension of the wall member interposed between the two branch grooves, in the circumferential direction of the central orifice.

6. An emitter as claimed in claim 1, wherein the wall member has a flat surface extending level with the inner flat surface at the bottom of the cavity, the membrane being compressed against it by the pressurized fluid.

7. An emitter as claimed in claim 1, wherein said flat surface of the wall member interposed between the two branch grooves extends radially beyond the peripheral edge of the internal central orifice, toward the center thereof.

8. An emitter as claimed in claim 1, wherein said flat surface of the wall member interposed between the two branch grooves extends and/or branches to reach one or more portions of the edge of the orifice.

9. An emitter as claimed in claim 1, wherein said flat surface extends along its longitudinal axis and connects to the diametrically opposite portion of the edge of the central orifice.

10. An emitter as claimed in claim 1, wherein the wall member interposed between the two branch grooves extends radially beyond the peripheral edge of the internal central orifice, toward the center thereof and at least partly in the axial direction of said orifice.

11. An emitter as claimed in claim 1, wherein the wall member interposed between the two branch grooves extends with at least one rib to reach at least one portion of the wall of the orifice on the substantially opposite side.

12. An emitter as claimed in claim 1, wherein the wall member interposed between the branch grooves extends along its longitudinal axis and connects to the diametrically opposite portion of the wall of the central orifice.

13. An emitter as claimed in claim 1, wherein the main groove has one or more branches opening into different portions of the cylindrical surface which delimits the central orifice.

14. An emitter as claimed in claim 1, wherein the membrane is made of a relatively soft and flexible material.

15. An emitter as claimed in claim 1, wherein it is of the type attached and/or soldered inside a pipe, and extending peripherally substantially all along the inside circumference thereof.

16. An emitter as claimed in claim 1, wherein it is of the type attached and/or soldered on one side inside the pipe, and extending peripherally along a portion of the inside circumference thereof.

17. An emitter as claimed in claim 1, wherein it is of the type attached and/or soldered on the outer surface of a pipe, there being provided at least one appendix for communicating with the interior of the pipe.

18. An emitter as claimed in claim 1, wherein such means are provided that the pressure exerted on the face of the membrane in direct contact with the fluid flowing inside the pipe is always higher than or equal to the pressure exerted on the opposite face.

19. An emitter as claimed in claim 1, wherein said means consist of a chamber provided at the outer peripheral edge of said inner flat surface, which chamber communicates with the cavity via a plurality of pressure reducing labyrinths, whereas the membrane is directly exposed to the fluid flowing in the pipe via an aperture and/or to the same opening communicating with the chamber.

20. An emitter as claimed in claim 1, wherein its body has a transverse and/or angular extension lower than the pipe diameter and than 360° respectively.

21. An emitter as claimed in claim 1, wherein it is provided externally and has an enclosure including an outlet spout or a hole and a spout to be fitted in a water-tight manner in a peripheral hole of the pipe.

* * * * *